United States Patent Office 3,164,608
Patented Jan. 5, 1965

3,164,608
PROCESS FOR THE PREPARATION OF SULTONES
Bruno Blaser, Dusseldorf-Urdenbach, Germany, assignor to Henkel & Cie. G.m.b.H., Dusseldorf-Holthausen, Germany, a corporation of Germany
No Drawing. Filed Dec. 5, 1962, Ser. No. 242,361
Claims priority, application Germany, Dec. 9, 1961, H 44,357
8 Claims. (Cl. 260—327)

The present invention relates to an improved process for the production of sultones from olefins.

From the work of Helberger it is known that sultones (inner esters) can be prepared from hydroxyalkane sulfonic acids by splitting off water at elevated temperatures under a vacuum. The prerequisite for the formation of sultones is, in the opinion of Helberger, that the hydroxyl group and the sulfonic acid group are not attached to adjacent carbon atoms (see German Patent 887,341).

Bordwell and Associates were able to prepare the sultone of 2,2,4-trimethyl-4-hydroxypentane sulfonic acid by dimerizing sulfonation of isobutylene with dioxane-$SO_3$ at —70° C. The same authors obtained sultones by sulfonation of γ-branched olefins, for instance 3-methyl-1-butene, with dioxane-$SO_3$. According to the theory advanced by Bordwell, the presence of a γ-branch is the prerequisite for the occurrence of this reaction.

It is an object of the present invention to prepare sultones from olefins having no branching in the β- or γ-position.

It is another object of the invention to develop a process for the preparation of sultones which comprises the steps of reacting about 1 mol of an α-olefin having the formula $$R_3R_2R_1C-CH_2-CH=CH_2$$

wherein $R_1$, $R_2$ and $R_3$ are selected from the group consisting of hydrogen and aliphatic hydrocarbon radicals, said olefin containing from 4 to 30 carbon atoms, with from about 1 mol to about 3 mols of sulphur trioxide at a temperature of between about —30° C. and about 80° C. and recovering said sultones by a process selected from the group consisting of (1) directly distilling said sultones from the reaction mixture under vacuum and (2) subjecting the reaction mixture to aqueous hydrolysis, separating the hydroxy sulfonic acids, and subjecting said hydroxy sulfonic acids to sultone formation by splitting off water by a process selected from the group consisting of (A) by directly distilling water therefrom and (B) by distilling water therefrom in the presence of an entrainment agent.

These and other objects of the invention will become more apparent as the description thereof proceeds.

It has now surprisingly been discovered that sultones may also be prepared from those olefins which are not branched in β or γ-position, especially from butene-1, by reacting the olefins with sulfur trioxide and recovering the sultone, preferably, when the olefin has 8 carbon atoms or less, by subsequently either (1) distilling the sultone directly out of the reaction product obtained in vacuo, or (2) transforming the sulfonation product into a hydroxy sulfonic acid by hydrolysis and subsequently splitting off water from this hydroxy sulfonic acid at an elevated temperature in vacuo by (A) direct distillation of water therefrom or by (B) employment of an entrainment agent.

This latter discovery of the recovery of sultones by hydrolysis and subsequent splitting off of water was equally surprising, because the hydroxy sulfonic acids produced by reaction of α-olefins with $SO_3$ and subsequent hydrolysis are, in accordance with the literature references, 2-hydroxy-1-sulfonic acids (E. E. Gilbert and E. P. Jones, Ind. and Eng. Chem., 43, 2023 (1951); C. M. Suter, P. B. Evans, J. M. Kiefer, J. Am. Chem. Soc., 60 538–540 (1938); F. G. Bordwell and M. L. Peterson, J. Am. Chem. Soc., 76, 3952–3956 (1954)) and, according to previous opinions, no sultones could be recovered from such sulfonic acids.

The starting materials for the process according to the present invention may be α-olefins having the following general formula:

$$R_3R_2R_1C-CH_2-CH=CH_2$$

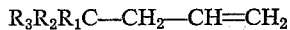

In this formula $R_1$, $R_2$ and $R_3$ represent hydrogen or aliphatic hydrocarbon radicals, preferably saturated radicals. Preferred as starting materials are the technically readily accessible straight chain α-olefins, such as butene-1 or n-hexene-1. Since it is often desirable that the sultones be purified by distillation, preference is given to short-chain olefins having up to 7 carbon atoms, especially butene-1. However, the process according to the present invention may also be used to prepare sultones from higher α-olefins, for instance, with 8 to 30 carbon atoms.

The sulfur trioxide may be employed for the process according to the present invention in a solid, liquid or gaseous state or also in the form of a solution, for instance in liquid $SO_2$, dichloroethane or in sulfuric acid. Gaseous sulfur trioxide is advantageously diluted with the aid of an inert gas, such as air, nitrogen or $SO_2$. The sulfur trioxide may also be employed in the form of its addition compounds, for instance, with dioxane or pyridine. Preferably, the sulfur trioxide is utilized for the process of the invention as present in a sulfur trioxide sulfonating agent selected from the group consisting of a solution of $SO_3$ in liquid $SO_2$, a solution of $SO_3$ in dichlorethane, and mixtures of gaseous $SO_3$ and inert gases having an $SO_3$ content of from 3 to about 15% by volume.

In general, the sulfur trioxide is employed in an amount of less than 1 mol to 2 mols or more mols per mol of olefin; for example, up to 3 mols per mol of olefin. The use of more sulfur trioxide than about 1 to 2 mols per mol of olefin can be employed, but no improvement in yield is accomplished thereby. In the event the reaction mixture is to be worked up by vacuum distilling the sultone therefrom directly, the use of an excess of $SO_3$ is not recommended. The reaction of the olefin with sulfur trioxide is effected in a manner known in principle, and a reaction temperature of about 60° C. is advantageously not exceeded. In the event of short periods it is also possible to operate at higher temperatures, such as 80° C. However, a rapid reaction may also be achieved at a temperature below 0° C. even at temperatures of —30° C. It is advantageous to work in a liquid or gaseous inert reaction medium, for instance in liquid $SO_2$.

The sulfonation product may be worked up in various ways, as indicated above. Preferably, when the starting olefin contains from 4 to 8 carbon atoms only two methods are employed. The first method consists of subjecting the raw sulfonation product to a vacuum distillation. In this manner it is possible to obtain the sultones directly, sometimes in admixture with volatile unsaturated sulfonic acids from which they can be easily separated by fractional distillation. In many cases it is advantageous to select the somewhat awkward second method for working up the raw sulfonation product, because this second method often yields a purer product and produces better yields. This second method consists of subjecting the reaction product of olefin and $SO_3$ first to aqueous hydrolysis. This may be accomplished in simple fashion by boiling with water. The hydroxyalkane sulfonic acid formed thereby can be isolated from the reaction solution, for instance in the form of its free acid or its alkali earth metal salts, the sulfuric acid present in solution being advantageously previously separated in the form of an alkaline earth metal sulfate. After completion of the hydrolysis, the acid solution may also be neutralized with an alkali and the mixture of alkali metal sulfate and alkali metal hydroxyalkane sulfonate obtained thereby may be separated by virtue of the different solubilities of these salts, for instance their solubilities in mixtures of methanol or ethanol and water.

The hydroxyalkane sulfonate thus obtained is subsequently transformed into the free acid, for instance, with the aid of hydrochloric acid or, more advantageously, with the aid of an ion exchanger. If the hydroxyalkane sulfonic acid is present in the form of its barium salt, sulfuric acid may be used for the transformation into the free acid. In this case it is advantageous to precipitate from the solution the major portion of the barium with sulfuric acid and to remove the residual amount with the aid of an ion exchanger.

For transformation into the sultone, water is split off from the hydroxyalkane sulfonic acid at elevated temperatures. The temperatures required for this step lie, in general, above 100° C. It is advantageous to operate between about 120 and 180° C. The removal of the water which is split off is facilitated by a reduced pressure and/or by the employment of an entrainment agent, such as xylene.

If the sultones have a relatively low boiling point, it is advantageous to purify them immediately after the cleavage of water by vacuum distillation. The cleavage of water and the distillation may be performed in a single continuous sequence. Higher sultones can also be purified by reprecipitation or recrystallization.

For the preparation of the sultones it is not necessary to isolate the hydroxyalkane sulfonic acids or their salts. It is also possible, in analogy to the process described in United States patent application Serial No. 107,292, filed May 3, 1961, to neutralize the raw reaction mixture only partially with an alkali subsequent to hydrolysis, the amount of alkali corresponding preferably to half the amount of sulfuric acid present in the mixture. After removal of the water, the sultone may be directly distilled out of the mixture thus obtained at reduced pressure, the distillation being advantageously performed in a thin-layer evaporator.

The following examples will further illustrate the present invention and enable others skilled in the art to understand the invention more completely. It is to be understood, however, that the following examples are not to be construed as limitations on the practice of the invention.

EXAMPLE 1

124 gm. of butylene were introduced over the course of 3 hours into a solution of 326 gm. of $SO_3$ in 325 gm. liquid $SO_2$ at −25° C., the reaction mixture being exteriorly cooled. Subsequently, the $SO_2$ was evaporated. The reaction product was admixed with 600 cc. of water, and the aqueous mixture was boiled for 3 hours. Thereafter, the solution thus obtained was diluted with water to twice its volume. The free sulfuric acid was precipitated from the solution by the addition of 500 gm. of $Ba(OH)_2 \cdot 8H_2O$. After separating the barium sulfate, the excess barium was precipitated in the form of its carbonate by introducing carbon dioxide while heating. The solution obtained thereby was evaporated to dryness. 386 gm. of raw barium hydroxybutane sulfonate remained behind.

353 gm. of this barium salt were dissolved in 3.5 l. of water. The aqueous solution was passed through a column packed with a strongly acid ion exchanger in order to transform the barium salt into the free acid. Thereafter, the solution obtained thereby was evaporated on a water bath. The hydroxybutane sulfonic acid thus obtained was heated at a pressure of 0.4 mm. Hg on an oil bath at 140–150° C. 111.5 gm. of butane sultone distilled off in the form of a slightly yellow liquid. The sultone was obtained in the form of a water-clear oil after repeating the distillation.

The sultone prepared in this manner is probably the sultone of 3-hydroxybutane-1-sulfonic acid, which has been heretofore accessible only by a relatively complicated method starting with an acetoacetate ester. This compound is clearly distinguishable from the sultone of 4-hydroxybutane-1-sulfonic acid and 4-hydroxybutane-2-sulfonic acid, which were described by Helberger, in that the characteristic reaction with pyridine proceeds distinctly slower with the butane sultone prepared by the process according to the present invention. In order to characterize this sultone, the following reactions were performed.

(a) *Reaction With Thiophenol*

0.3 gm. of sodium was dissolved in 8 cc. of ethyl alcohol. 1.10 gm. of thiophenol and then 1.40 gm. of the above-obtained butane sultone were added to this solution. After a few minutes a substantial precipitation of crystals occurred. These crystals were dried on clay and were then recrystallized from methanol. Colorless leaflets were obtained which were analyzed to have the following formula:

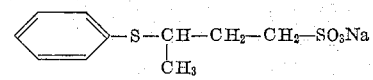

(b) *Reaction With 4-Chlorophenol*

0.64 gm. of sodium were dissolved in 16 cc. of ethanol. 2.60 gm. of 4-chlorophenol and 2.80 gm. of the above-obtained sultone were added to this solution. After a few minutes an ample precipitation of crystals took place. After allowing the mixture to stand overnight, it was filtered, the filter cake was washed and dried on clay. Thereafter, the crystals were recrystallized from ethanol. Colorless leaflets were obtained, whose analysis showed that they had the following formula:

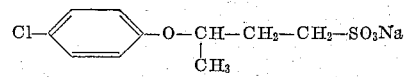

(c) *Reaction With Pyridine*

2.80 gm. of the above-obtained sultone were dissolved in 100 cc. of benzene. 1.60 gm. of pyridine were added to the solution. The solution was heated for 6 hours at 60° C. After about 10 minutes the solution became cloudy and an oil precipitate separated out, which crystallized upon standing overnight. After recrystallization from isopropanol, the analysis of the product showed that it had the following formula:

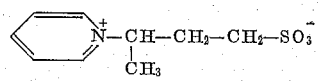

EXAMPLE 2

84.2 gm. of n-hexene-1 were added dropwise over the course of an hour and a half to a solution of 160 gm. of $SO_3$ in 200 cc. of liquid $SO_2$, accompanied by stirring and cooling. After evaporation of the $SO_2$, the reaction product was boiled with 300 cc. of water for 3 hours. Thereafter, the solution was diluted with 700 cc. of water and the free sulfuric acid was precipitated with 2 l. of an aqueous 20% barium hydroxide solution. After separation of the barium sulfate, the excess barium was precipitated as carbonate by introduction of $CO_2$ while heating, and the precipitate was separated. The filtrate was evaporated to dryness on a steam bath. 226 gm. of barium hydroxyhexane sulfonate were obtained.

200 gm. of this barium salt were dissolved in 2 l. of water. About 90% of the barium was precipitated as barium sulfate by addition of sulfuric acid, and the precipitate was separated. The residual barium was removed from the solution with the aid of a strongly acid ion exchanger. The solution of the free hydroxyhexane-sulfonic acid thus obtained was concentrated on a steam bath. Subsequently, water was split off and the distillation of the sultone was effected at a pressure of 0.3 to 0.5 mm.

Hg and at a bath temperature of 140–150° C. The hexane sultone passed over at a temperature of 109–116° C. and was obtained with good yield.

EXAMPLE 3

34 gm. of SO₃, in the form of a mixture of SO₃ and air containing 6.5% of SO₃, were introduced over the course of one hour into 101 gm. of octene-1. A dark colored, thin liquid reaction product was obtained, which was refluxed for 1½ hours with 450 cc. of water. Thereafter, the free sulfuric acid was precipitated from the solution thus obtained with an excess of an aqueous 10% barium hydroxide solution, while heating. After filtering off the barium sulfate, the excess barium was precipitated as a carbonate by introducing carbon dioxide. After filtration the solution was evaporated to dryness, leaving behind 53.7 gm. of raw barium hydroxyoctane sulfonate.

50 gm. of this salt were transformed into the free acid with the aid of an ion exchanger as described in Example 1. The aqueous solution of the free acid was evaporated. Thereafter, the residue was subjected to vacuum distillation. For this purpose the reaction product was added dropwise to a distillation flask under a vacuum of 0.3 to 0.4 mm. Hg, which was heated on an oil bath at a temperature of 230–240° C. 18 gm. of octane sultone distilled off, which were obtained analytically pure by repeating the distillation.

EXAMPLE 4

101 gm. of butene-1 were introduced over the course of 3 hours into a solution of 160 gm. of SO₃ in 200 cc. of liquid SO₂ at −25° C., accompanied by stirring, the reaction mixture being exteriorly cooled. The SO₂ was then evaporated. The reaction product weighed 215 gm. The amount of unreacted butene in the reaction mixture was not determined in this run.

90 gm. of the raw reaction product were subjected to a vacuum distillation at a pressure of 0.5 to 0.8 mm. Hg, the distillation flask being heated on an oil bath at 140–160° C. The raw, slightly yellow butane sultone distilled off. The yield was 29.5 gm. The butane sultone was obtained analytically pure by repeating the distillation.

EXAMPLE 5

42 gm. of hexene-1 were added dropwise over the course of 2 hours to a solution of 80 gm. of SO₃ in 100 cc. of liquid SO₂ at −25° C., accompanied by stirring, the reaction mixture being cooled exteriorly. Thereafter the SO₂ was evaporated. The raw sulfonation mixture thus obtained was subjected to vacuum distillation in the same manner as described in Example 3 for the distillation of the sultone, the oil bath temperature being 210–220° C. Raw hexane sultone passed over, which was obtained analytically pure by repeating the distillation. The yield was 24 gm.

EXAMPLE 6

272 gm. of the primary reaction product was produced from 160 gm. of SO₃ and 112 gm. of octene-1 in the same manner as described in Example 5. Upon direct distillation of the raw product in vacuo at an oil temperature of 210–220° C., 52.5 gm. of raw octane sultone were obtained. After repeating the distillation, the sultone was analytically pure.

EXAMPLE 7

A solution of 88 gm. of SO₃ in 200 cc. of dichloroethane was added over the course of 60 minutes dropwise to a solution of 60 gm. of n-butene-1 in 200 cc. of 1,2-dichloroethane, accompanied by vigorous stirring. During the addition of the SO₃ solution, the reaction mixture was maintained at a temperature between 0 and −10° C. After all of the SO₃ solution had been added, the unreacted butene and the major amount of the dichloroethane were removed under an aspirator vacuum at a bath temperature up to 30° C. The residue was distilled at a pressure of 0.4 mm. Hg. 73.4 gm. of butane sultone passed over. The product was obtained in a pure, colorless state by repeating the distillation.

EXAMPLE 8

240 gm. of liquid SO₃ were added dropwise, accompanied by stirring, over a period of 25 minutes to a mixture of 264 gm. of 1,4-dioxane and 600 cc. of 1,2-dichloroethane at a temperature of 0 to −3° C. The slurry of the SO₃-dioxane adduct obtained in this manner was added dropwise, accompanied by stirring, over a period of 10 minutes to a solution of 56 gm. of n-butene-1 in 400 cc. of 1,2-dichloroethane, while the mixture was maintained at about −5° C.

Subsequently, the reaction mixture was admixed with 50 cc. of water. Thereafter, the solvents were removed by means of steam distillation. After addition of an additional 500 cc. of water, the mixture was refluxed for 5 hours. The sulfate ions were then precipitated in the form of barium sulfate by addition of a solution of 946.5 gm. of Ba(OH)₂·8H₂O in 1.5 liters of water, and the precipitate was filtered off. Excess barium was removed from the solution by introducing carbon dioxide. After filtering off the barium carbonate, the filtrate was evaporated on a water bath. The residue was dried in a dryer at 110° C. 160 gm. of raw barium hydroxybutane sulfonate were obtained.

The barium sulfonate thus recovered was dissolved in 1 liter of water. The aqueous solution was freed from barium with the aid of a strongly acid ion exchanger (Lewatit S 100). Subsequently, the solution was evaporated and the residue was subjected to a vacuum distillation. At 120–125° C. and 0.6 mm. Hg, 77.3 gm. of butane sultone passed over in the form of a clear colorless liquid. After repeating the distillation, the sultone had a refraction index of 1.4500 (25° C.), so that it could be assumed that it was butane sultone-1,3.

The above examples illustrate the process of the invention. While the above examples are illustrative of the principle of the invention, on a batch basis, it is obvious that the process may be performed in a continuous manner and the process is admirably suited for large scale continuous production. It will be readily apparent to those skilled in the art that the present invention is not limited to the specific embodiments, and that various changes and modifications may be made without departing from the spirit of the invention or the scope of the appended claims.

I claim:

1. A process for the preparation of a sultone which comprises the steps of reacting about one mol of an α-olefin of the formula $$R_3R_2R_1C-CH_2-CH=CH_2$$

wherein $R_1$, $R_2$, and $R_3$ are selected from the group consisting of hydrogen and aliphatic hydrocarbon, said olefin containing from 4 to 30 carbon atoms, with about 1 mol to about 3 mols of sulfur trioxide to form a reaction mixture, and recovering said sultone by directly distilling said sultone from said reaction mixture under vacuum.

2. The process of claim 1 wherein said α-olefin is a straight chain compound having from 4 to 7 carbon atoms.

3. The process of claim 1 wherein said α-olefin is butene-1.

4. The process of claim 1 wherein said sulfur trioxide is present in a sulfur trioxide sulfonating agent selected from the group consisting of a solution of SO₃ in liquid SO₂, a solution of SO₃ in dichloroethane, and mixtures of gaseous SO₃ and inert gases having an SO₃ content of from 3 to about 15% by volume.

5. A process for the preparation of a sultone which comprises the steps of reacting about one mol of an α-olefin of the formula $$R_3R_2R_1C-CH_2-CH=CH_2$$

wherein $R_1$, $R_2$, and $R_3$ are selected from the group consisting of hydrogen and aliphatic hydrocarbon, said olefin containing from 4 to 30 carbon atoms, with about 1 mol to about 3 mols of sulfur trioxide to form a reaction mixture, and recovering said sultone by subjecting said reaction mixture to aqueous hydrolysis, separating hydroxy sulfonic acid and heating said hydroxy sulfonic acid at elevated temperatures to split off water.

6. The process of claim 5 wherein said α-olefin is a straight chain compound having from 4 to 7 carbon atoms.

7. The process of claim 5 wherein said α-olefin is butene-1.

8. The process of claim 5 wherein said sulfur trioxide is present in a sulfur trioxide sulfonating agent selected from the group consisting of a solution of $SO_3$ in liquid $SO_2$, a solution of $SO_3$ in dichloroethane, and mixtures of gaseous $SO_3$ and inert gases having an $SO_3$ content of from 3 to about 15% by volume.

References Cited in the file of this patent

UNITED STATES PATENTS

| | | |
|---|---|---|
| 1,913,794 | Daimler et al. | June 13, 1933 |
| 2,793,229 | Blaser et al. | May 21, 1957 |

FOREIGN PATENTS

| | | |
|---|---|---|
| 905,684 | France | Apr. 23, 1945 |

OTHER REFERENCES

Bordwell et al.: Jour. Amer. Chem. Soc., vol. 67 (1945), pages 827–831.

Morton: Lab. Tech. in Org. Chem., McGarw-Hill Co., New York (1938), pages 63 and 64.